United States Patent Office 3,446,867
Patented May 27, 1969

3,446,867
PURIFICATION OF DETERGENT ALKYLATES
Oliver C. Kerfoot and Thomas E. Howell, Ponca City, Okla., assignors to Continental Oil Company, Ponca City, Okla., a corporation of Delaware
No Drawing. Continuation-in-part of application Ser. No. 388,685, Aug. 10, 1964. This application Jan. 4, 1968, Ser. No. 695,584
Int. Cl. C11d 1/12; C07c 25/14; C07b 27/00
U.S. Cl. 260—671                              1 Claim

ABSTRACT OF THE DISCLOSURE

A partially chlorinated detergent range normal paraffin or mixture thereof is condensed with benzene in the presence of aluminum chloride catalyst to provide a crude alkylation reaction mixture from whence a detergent alkylate fraction is obtained by distillation and then washed with concentrated sulfuric acid prior to the conversion thereof to water-soluble mono-sulfonic acid salt derivative via sulfur trioxide sulfonation.

CROSS REFERENCE TO RELATED APPLICATION

This application is a continuation-in-part of application Ser. No. 388,685, filed Aug. 10, 1964, and now abandoned.

BACKGROUND OF THE INVENTION

Field of the invention.—This invention relates to a method for obviating the presence of color bodies and sulfonate color precursors from n-alkaryls prepared using alkyl chlorides as the alkylating agent prior to the conversion thereof to sulfonic acid salt derivatives by means of sulfur trioxide sulfonation.

Description of the prior art.—It is well known to prepare highly effective, water-soluble surfactants by sulfonating, either with oleum or sulfur trioxide, the detergent alkylates obtained by alkylating an excess of an aromatic compound, usually benzene, with an olefin having from about 12 to 15 carbon atoms. The art has become very advance in the preparation of this type of surfactant, particularly with respect to techniques for obtaining relatively pure products approaching whiteness in color. While any moderate discoloration of alkyl benzene sulfonates has no discernible effect upon the surface active properties, nevertheless good color for these products has become a prime requirement on the part of the manufacturer or formulator of the detergent compositions in which these surfactants are prevalently employed. The purification procedure generally utilized in preparing light-colored sulfonate salts of the aforedescribed surfactants consists of treating the crude alkylation reaction mixture, from which the spent catalysts values have been removed, with concentrated sulfuric acid prior to recovering a suitable fraction of the alkylate for conversion to its sulfonic acid derivatives.

The prior art surfactants generally described above, while exhibiting excellent properties on many counts, nevertheless suffer because they are stubbornly resistant to biodegradation. This deficiency is attributable to the structural configuration of the particular olefinic alkylating agent employed almost exclusively in preparing these substances. Such olefins are obtained by polymerizing propylene to a tetramer or pentamer. The inherent branched configuration associated with these polymers renders the alkylate prepared therefrom highly resistant to assimilation by bacteria in the usual waste disposal processes.

More recently, the manufacturers of water-soluble surfactants have concentrated their efforts in devising methods for preparing biodegradable counterparts of abovedescribed hard surfactants. One applicable method proposed for the preparation of soft detergent alkylates involves initially chlorinating a $C_{10}$–$C_{15}$ straight-chain paraffin or mixture thereof to a partial extent to yield a chlorination product containing a minor amount of alkyl chlorides substantially composed of the monochloro isomers. Chlorination products for this purpose can be readily obtained by reacting from about 0.1 to 0.4 mole of chlorine per mole of paraffin while observing conventional chlorination conditions. Further in accordance with this recently developed method, it has not been found feasible to remove the alkyl chloride content of the chlorination product; and consequently, the total chlorination product is utilized as the alkylating stock. Upon effecting alkylation, the unused paraffin is recycled and the resultant alkylate recovered and sulfonated to provide the biologically soft surfactant.

In our investigations directed to the preparation of biologically soft surfactants in line with the method described above, we have noted that in treating the crude alkylation reaction mixture with concentrated sulfuric acid analogous to the procedure employed for many years in the preparation of the hard versions of these materials, an alkylate is obtained which when sulfonated with oleum yields sulfonic acid derivatives having acceptable color. However, upon converting the alkylate treated in the aforesaid conventional manner to their sulfonic acids derivatives by means of sulfur trioxide sulfonation, it was unexpectedly found that the resultant sulfonic acids, as well as their water-soluble salts, exhibited a very objectionable degree of coloration.

Summary of the invention

The present invention, therefore, resides in a combined alkylate preparative and purification method for obviating the presence of certain sulfonate color precursors prone to be present in a detergent alkylate product prepared by the aluminum chloride catalyzed condensation of a partially chlorinated normal paraffin with benzene. Specifically, this method basically involves the following sequential steps:

(1) Condensing a partially chlorinated n-paraffin with an excess of benzene to the extent that predominantly all of the combined chlorine content of the former is reacted.

(2) Distilling the alkylation reaction mixture obtained in accordance with step (1) to recover an alkyl benzene fraction essentially free of higher boiling polynuclear aromatic condensation products.

(3) Washing said recovered alkyl benzene fraction with concentrated sulfuric acid.

Object of the invention

The object of this invention is twofold in nature; namely, to provide a detergent alkylate derived by condensing an n-alkylchloride with benzene having essentially water-white color characteristics and such an alkylate which when sulfonated with sulfur trioxide yields water-soluble sulfonate salt derivaties having a RCD value of not greater than about 0.3.

Description of the preferred embodiments

As is evident from the foregoing general statement of the invention, three relatively independent criteria must be met in securing a suitably pure alkylate for conversion to the sulfonate derivative.

Firstly, the alkylation must be carried out to the extent whereby the resultant reaction product contains essentially no residual chlorine. The applicable partially chlorinated paraffin products contain from about 2 to 8 percent combined chlorine depending upon the molecular weight of the paraffin or mixture thereof and the degree of chlorination practiced, the latter lying in the range of from about 10 to 40 mol percent. Further details concerning applicable direct chlorination methods for obtaining such partially chlorinated products are set forth in United States Patent No. 3,316,294.

The tolerable limit of said residual chlorine is no more than 1 percent, and preferably less, of the combined chlorine present initially in the partially chlorinated product. Stated otherwise, it is essential that the alkylation reaction be carried out to the extent whereby at least 99 percent of the combined chlorine content of the alkylating agent is reacted. Achieving this degree of reaction can be accomplished following conventional alkylation practices which are amply exemplified in the above-mentioned patent amongst others.

In order to understand more fully the second requirement of our purification method, namely, that of distilling the alkylation reaction mixture to recover a detergent alkylate fraction essentially free of higher boiling polynuclear aromatic condensation products, a brief explanation of the chemistry involved in the contemplated reaction system is desirable.

As indicated hereinabove, a partially chlorinated paraffin product is used as the alkylating agent to prepare the alkylates to which this invention is directed. Such partially chlorinated products necessarily contain some polychlorides, principally dichlorides, wherein the statistical amount thereof is in direct proportion to the level of chlorination observed in preparing these products. Contrary to what one might expect, the dichloride content of the alkylating agent does not exclusively lead to the formation of diphenylalkanes. Rather, a substantial portion of the dichlorides result in the formation of an alicyclic alkylate, believed to be mainly composed of alkyl substituted 1,2,3,4-tetrahydronaphthalenes. This type of alkylate is desirably recovered along with alkyl benzenes since it also can be converted by sulfonation to a satisfactory detergent.

In addition to the aforesaid alicyclic alkylate, the polychlorides present in the contemplated alkylating agents result in the formation of exceedingly small amounts of polynuclear or fused-ring aromatic compounds which are believed to be made up largely of alkyl substituted anthracenes and naphthalenes. Evidence points to the fact that some of these polynuclear entities are the principal sulfonate color precursors present in detergent alkylates of the type herein concerned.

Since the bulk of the polynuclear compounds produced in any given alkylation reaction system exhibit a boiling point range exceeding the boiling point of the highest molecular weight alicyclic alkylate formed therein, we have found that a detergent alkylate fraction essentially free of the objectionable color precursors can be obtained by careful distillation practices.

The term "essentially free" as used in the foregoing context implies that it is not necessary to obtain at this stage an alkylate completely free of the color precursors. Such an accomplishment for all practical purposes is virtually unobtainable, particularly when the alkylate is prepared from a mixture of alkyl chlorides. In this connection, it has been noted that the amount of postalkylate contained in the recovered alkylate fraction is reasonably indicative of the amount of the objectionable sulfonate color precursors entrained therein. Postalkylate refers to the bottoms normally obtained in the alkylation reaction of the type concerned which is predominantly composed of diphenylalkanes and dialkylbenzenes. Accordingly, if the distilled alkylate fraction is essentially completely free of such postalkylate, the subsequent acid treating step will effectively rid the alkylate of sulfonate color precursors entrained therein.

After obtaining a detergent alkylate fraction in accordance with the procedural steps outlined hereinabove, the fraction is then washed with concentrated sulfuric acid. The strength of the sulfuric acid can range between about 85 and 100 percent. The preferred strength of the sulfuric acid solution is about 97.0 percent. Acids of strength higher than the maximum indicated can be used; however, such acids tend to give rise to emulsion problems upon subsequent treatment of the alkylate in order to remove all acidic components.

The amount of sulfuric acid can range from about 1 to 25 weight percent based upon the weight of the alkylate treated. Preferred amounts are from about 2 to 5 percent on the aforesaid basis. Applicable temperatures for carrying out the sulfuric acid wash are from about 15° to 75° C. A particularly preferred range of treating temperatures is from about 20° to 40° C. A suitable procedure for treating the alkylate consists of adding the amount of sulfuric acid to be used directly to the alkylate maintained at a desired treating temperature while rapidly stirring the mixture. Generally, continued stirring for about five minutes suffices to effect satisfactory purification of the alkylate. However, the selection of optimum contact time is governed by such conditions as the strength of the acid employed, the temperature observed in the treatment, and also the particular ratio of sulfuric acid to alkylate utilized. In general, the sulfuric acid treating conditions should be selected to result in the lowering of the bromine number of the alkylate to value not in excess of 0.04. Successive acid treating operations can, if desired, be utilized to achieve the requisite lowering of bromine number.

Following the treatment with sulfuric acid, the mixture is permitted to settle for sufficient length of time, whereupon, the lower acid layer is drawn off. The sulfuric acid treated alkylate can be directly reacted with sulfur trioxide. It is preferred, however, to further condition this alkylate in order to remove all traces of acidic components. Such a cleaning-up step can be accomplished by washing the treated alkylate with a dilute aqueous base followed by a water wash and then drying. An alternative method for removing the small amounts of acid present in the treated alkylate consists of contacting the alkylate with a suitable absorbent, e.g., basic clays, activated carbon, and the like.

In order to illustrate this invention further, the following example is set forth. As indicated, this example is given primarily for purposes of illustration; and accordingly, any enumeration of details contained therein should not be interpreted as limitations upon the invention except as such are expressed in the appended claims. All parts mentioned are parts by weight unless otherwise indicated.

EXAMPLE

A fraction of $C_{10}$–$C_{15}$ straight-chain paraffins was recovered from a kerosene range distillate by a conventional molecular sieving operation. The straight-chain paraffin mixture was then chlorinated at a temperature of about 120° C. until the combined chlorine content amounted to about 3.4 percent. This represented a degree of chlorination of about 20 mole percent.

Into a suitable alkylation reaction vessel were charged 1,000 parts of the partially chlorinated paraffin mixture described above, 10 parts aluminum chloride, and 705 parts benzene. The reaction mixture was heated at 65° C. with stirring. The hydrogen chloride formed during the course of the reaction was vented from the alkylation reaction vessel. The progress of the alkylation reaction was followed by withdrawing samples periodically and analyzing for chlorine content. The reaction mixture was held at the indicated tempearture for 90 minutes, at which time the chlorine level was nil, indicating complete reaction of the alkyl chlorides present in the reaction mixture.

The alkylation reaction mixture was permitted to settle for 180 minutes, and the spent catalyst was drawn off in the form of sludge products. Following neutralization, the resulting crude reaction mixture was topped to remove unreacted benzene followed by distillation to remove free paraffins. Next, the alkylate product was fractionated to yield a fraction composed of monoalkylbenzenes and alicyclic alkylate having a boiling point range of from 273° to 370° C. and a postalkylate content in the order of about 0.05 percent.

Portions of the recovered alkylate fraction were treated with the concentrated sulfuric acid following the general procedure of charging the alkylate to a suitable mixing vessel, bringing it to the desired treating temperature, and thereupon rapidly adding the concentrated sulfuric acid heated to approximately the tempearture of that of the alkylate. The specific conditions utilized in the exemplary runs presented in this example, together with the results obtained in terms of the color observed for the sodium sulfonate salts of the alkylate obtained by sulfonating the alkylate with sulfur trioxide and thereupon neutralizing with caustic soda are given in the following table. The bromine number of the untreated alkylate was about 0.1 whereas, each of the sulfuric acid treated samples exhibited a bromine number of less than 0.04.

TABLE

| Run | Percent $H_2SO_4$ | Treating level #$H_2SO_4$/#Alk. | Temp., °C. | Time, min. | Sulfonate Color, RCD[1] |
|---|---|---|---|---|---|
| 1 | 0 | None | | | 1.20 |
| 2 | 97 | .15 | 57 | 5 | .15 |
| 3 | 97 | .05 | 57 | 5 | .27 |
| 4 | 97 | .15 | 38 | 5 | .15 |
| 5 | 97 | .05 | 38 | 5 | .17 |
| 6 | 97 | .04 | 38 | 5 | .17 |
| 7 | 97 | .02 | 38 | 5 | .28 |
| 8 | 93 | .15 | 57 | 5 | .31 |
| 9 | 93 | .05 | 57 | 5 | .27 |
| 10 | 100 | .02 | 38 | 5 | .15 |

[1] RCD—Relative color density of a 4 percent aqueous solution of the sulfonate compared with a standard dichromate solution; color readings taken in a Klett Summerson Colorimeter using a 4 cm. cell and a No. 42 filter.

What is claimed is:

1. In the manufacture of water-soluble detergents derived by sulfonating an alkaryl with sulfur trioxide, the improvement of preparing the alkaryl comprising the sequential steps:
   alkylating an excess of benzene in the presence of aluminum chloride catalyst with a partially chlorinated $C_{10}$–$C_{15}$ n-paraffin or mixture thereof containing from about 2–8 percent combined chlorine to the extent that at least 99 percent of said combined chlorine is reacted;
   distilling the alkylation reaction mixture to recover an alkyl benzene fraction essentially completely free of condensation products having a boiling temperature greater than that of the alicyclic alkylate derived from the highest molecular weight alkyl chloride present in said partially chlorinated product;
   contacting said alkyl benzene fraction at a temperature between about 15° and 75° C. with 1 to 25 percent based on the weight thereof of from about 85 to 100 percent sulfuric acid to provide a purified alkylate phase having a bromine number of not in excess of about 0.04.

References Cited

UNITED STATES PATENTS

| 2,932,677 | 4/1960 | Kirk et al. | 260—674 |
| 3,209,045 | 9/1965 | Feighner et al. | 260—671 |
| 3,316,294 | 4/1967 | Freighner et al. | 260—671 |
| 3,338,983 | 8/1967 | Thompson | 260—671 X |

DELBERT E. GANTZ, *Primary Examiner*.

C. R. DAVIS, *Assistant Examiner*.

U.S. Cl. X.R.

260—505, 674